UNITED STATES PATENT OFFICE.

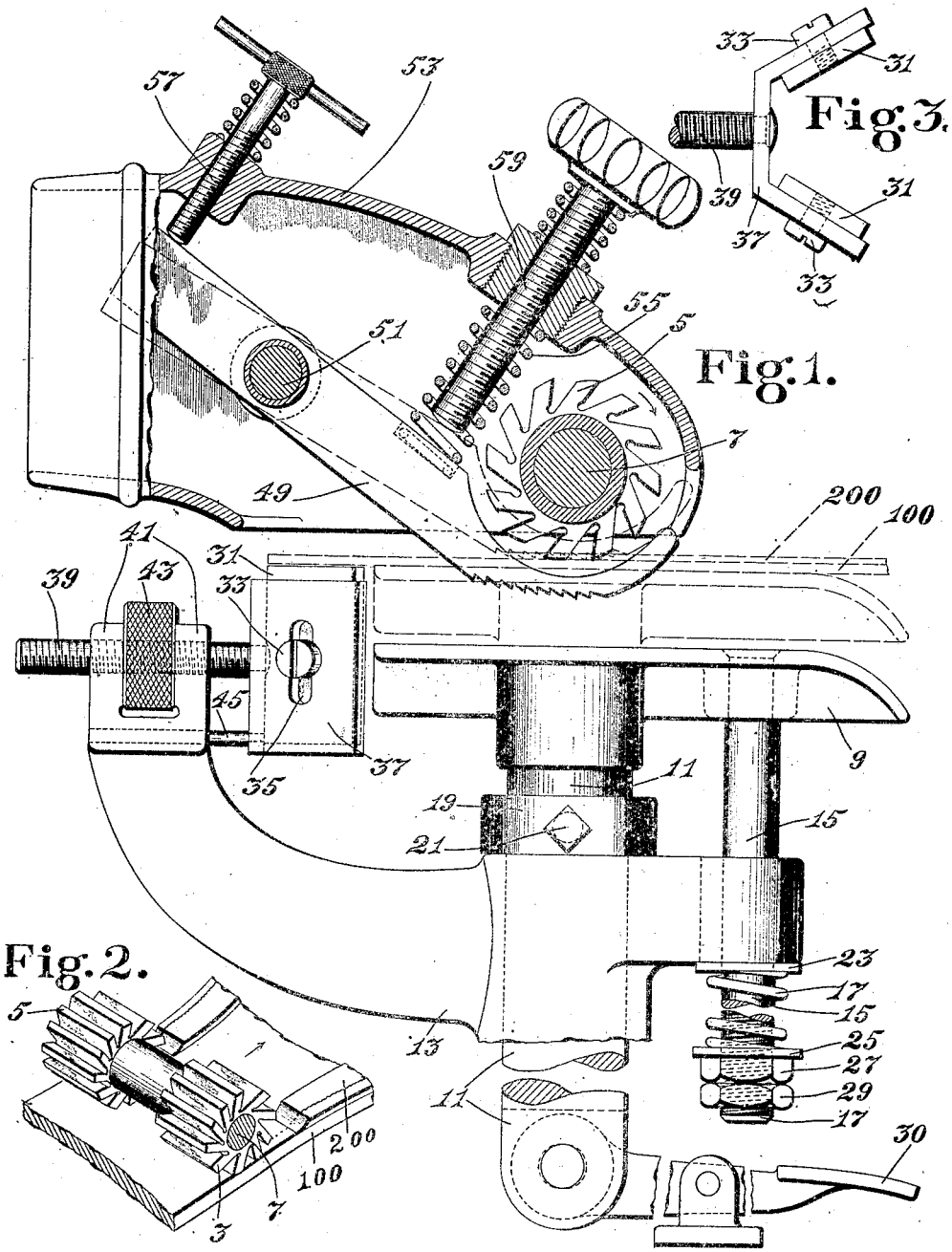

FREDERICK M. FURBER, OF REVERE, MASSACHUSETTS, ASSIGNOR TO UNITED SHOE MACHINERY CORPORATION, OF PATERSON, NEW JERSEY, A CORPORATION OF NEW JERSEY.

WELT-BUTTING MACHINE.

1,368,331.      Specification of Letters Patent.      Patented Feb. 15, 1921.

Application filed March 14, 1919. Serial No. 282,674.

*To all whom it may concern:*

Be it known that I, FREDERICK M. FURBER, a citizen of the United States, residing at Revere, in the county of Suffolk and State of Massachusetts, have invented certain Improvements in Welt-Butting Machines, of which the following description, in connection with the accompanying drawings, is a specification, like reference characters on the drawings indicating like parts in the several figures.

This invention relates to cutting machines and is herein illustrated as embodied in a machine for butting welts.

In the manufacture of Goodyear welt shoes it is customary to stitch a welt to the upper and insole to provide means for attaching the sole to the shoe. In the manufacture of McKay shoes a mock welt is usually attached to the sole prior to the stitching of the sole to the shoe. In either case the ends of the welt should be cut off on a bevel at approximately the line of the heel breast; and this cutting-off operation is commonly known as welt butting. The illustrative machine which has been shown is particularly adapted to butt the ends of mock welts which have been attached to McKay soles, but it should be understood that this showing has been made to promote brevity and that the invention is not limited in its broader aspects to the performance of this particular operation.

In butting welts it has been customary hitherto to employ a chopping or slicing knife or a pair of shear members. In the use of all of these constructions the presentation of the work in proper position to have the welt butted has required considerable time, and the reciprocating and bringing to rest of the knife or shear blade has also contributed to render the operation slow. The general object of the present invention is to provide a machine by the use of which welt butting and similar operations may be more rapidly carried out.

According to one feature of the invention there is provided a tool and a work support relatively movable toward and from each other, and a fixed work-positioning gage in the rear of the tool. In the illustrative machine a rotary cutter rotates continuously above a supporting table, which is normally spaced from the cutter; and in the rear of the cutter is a gage against which the end of a sole may be thrust. The sole having been thus properly located, the table is raised to bring the welt into contact with the cutter, and the sole is then drawn out past the cutter. With such a machine the welt butting operation may be performed very rapidly and accurately.

Since the operative portion of the rotating cutter is always moving toward the gage, there is a tendency for the sole, particularly if it is of poor quality, to bunch up between the cutter and the gage. In order to counteract this tendency and to hold the sole flat, another feature of the invention relates to a two-part cutter and a presser extending between the parts into contact with the work to hold the work in contact with the table.

These and other features of the invention, including certain details of construction and combination of parts will be described as embodied in an illustrative machine and pointed out in the appended claims.

Referring now to the accompanying drawings,—

Figure 1 is a side elevation, partly in section, of a machine in which the present invention is embodied, Fig. 2 is a detail perspective showing more particularly the construction of the two-part cutter, and Fig. 3 is a plan view of the gage.

The cutter comprising the spaced portions 3 and 5 is fast to a shaft 7 which is mounted in bearings in the frame of the machine and may be rotated and controlled by any suitable mechanism such for example as a belt and tight and loose pulleys, not shown. In the operation of the machine, the shaft is rotated continuously in the direction indicated by the curved arrow in Fig. 1. Located beneath the cutter is a work supporting table 9 having a stem 11 which is vertically slidable in a bearing in the frame 13 of the machine. A guide pin 15, also vertically slidable in a bearing in the frame is continually acted upon by a coiled spring 17 in a manner to urge the table downwardly, the extent of such downward movement being limited by a collar 19 adjustably fastened to the stem 11 by a set screw 21 in position to engage the frame of the machine as shown. The spring 17 bears at its upper end against a washer 23, which abuts the frame of the machine, and at its lower end against a washer 25 which is supported by an adjusting nut 27. A lock-nut 29 holds the nut 27 in adjusted position. With this construction the table is normally held in the lowered position shown in full lines by a tension which may be varied. A treadle 30, mounted as shown, provides means for raising the table.

Located in the rear of the tool and the table is a work-positioning gage comprising two plates 31 adjustably held in vertical position by screws 33 which pass through slots 35 in a holder 37 and are threaded into the plates. A stem 39 fast to the holder and extending through perforated lugs 41, formed on the frame of the machine has threaded upon it a thumb nut 43 by manipulating which the gage may be adjusted horizontally, a pin 45, fast to the carrier 37 and extending into a bore in the frame, preventing rotation of the screw and holder.

In the operation of the machine as thus far described, a sole 100 with a welt 200 attached is thrust along the top of the table beneath the cutter until its heel end contacts with the gage. The table with the work upon it is then raised by means of the treadle 30 into the position indicated in broken lines in Fig. 1 and then the work is drawn back by the operator thereby causing the cutter to butt the welt and traverse the rear portion of the sole. The table is ordinarily raised to a height just sufficient to cause the cutter to cut through the welt but may be raised a trifle more if desired in which case the heel seat may be fleshed at the same time the welt is butted.

Owing to the direction of rotation of the cutter, a sole of poor quality is liable to bunch up at the rear of the cutter; and to prevent this there is provided a presser 49 pivoted at 51 to the walls of the hood 53 which partially incloses the cutter, said presser having a toothed operative portion to engage the sole between as well as to the rear of the spaced parts 3, 5 of the cutter. A coiled spring 55 normally holds the operative end of the presser below the level of the lowermost portion of the cutter, its distance below being limited by an adjustable stop screw 57. A second adjustable stop screw 59 limits the extent of upward movement of the operative end of the presser. With this construction the sole is held firmly against the table at and to the rear of the locality engaged by the cutter.

Having fully described my invention, what I claim as new and desire to secure by Letters Patent is:

1. A machine of the class described, having in combination, a tool, a blank support, means for causing relative movement of separation and approach between the tool and the support, and a blank-positioning gage located in the rear of the tool whereby a blank may be thrust forward between the tool and the support into contact with the gage, presented to the tool and then drawn back to cause a predetermined locality of the blank to be operated upon by the tool.

2. A machine of the class described, having in combination, a rotary tool, a blank support, means for causing relative movement of separation and approach between the tool and the support, and a blank-positioning gage located in the rear of the tool whereby a blank may be thrust forward between the tool and the support into contact with the gage, presented to the tool and then drawn back to cause a predetermined locality of the blank to be operated upon by the tool.

3. A machine of the class described, having in combination, a rotary tool, a support movable into blank-receiving and blank-presenting position, and a blank-positioning gage located in the rear of the tool whereby a blank may be thrust between the support and the tool into contact with the gage, presented to the tool and then drawn back along the support to cause a predetermined extent of the blank to be operated upon by the tool.

4. A machine of the class described, having in combination, a rotary tool, a support movable into blank-receiving and blank-presenting position, and a blank-positioning gage located in the rear of the tool whereby a blank may be thrust between the support and the tool into contact with the gage while the support is in blank-receiving position, presented to the tool by moving the support and then drawn back along the support to cause a predetermined extent of the blank to be operated upon by the tool.

5. A machine of the class described, having, in combination, a rotary tool, a blank support, means for causing relative movement of separation and approach between the tool and the support, a fixed blank-positioning gage located in the rear of the tool in the path of a blank which is thrust forward along the support, and a presser located in proximity to the tool.

6. A machine of the class described, having in combination, a rotary tool, a blank support, means for causing relative movement of separation and approach between the tool and the support, a blank-positioning gage located in the rear of the tool in the path of a blank which is thrust forward along the support, and a presser in position to hold the blank against the support close to the tool between the tool and the gage.

7. A machine of the class described, having in combination, a rotary cutter, a blank support normally spaced from the cutter, means for moving the support toward the cutter, a presser normally extending below the cutter, a stop for limiting the upward movement of the presser, and a blank-positioning gage located at the rear of the support.

8. A welt butting machine, having in combination, a milling cutter, means for rotating the cutter, a support for a sole blank the ends of the attached welt of which are to be butted, and means for presenting the blank to the cutter in position to cause the cutter to bevel the ends of the welt.

9. A welt butting machine, having in combination, a welt butting tool comprising spaced cutters, a support for a sole blank the ends of the attached welt of which are to be butted, and a gage for positioning the sole blank on the support.

10. A welt butting machine, having in combination, a welt butting tool comprising spaced cutters, a support for a sole blank the ends of the attached welt of which are to be butted, a gage for positioning the sole blank on the support, and a presser arranged to engage the sole blank between the cutters.

11. A welt butting machine, having in combination, a rotary tool comprising spaced cutting portions, a presser having its operative portion located between the spaced portions of the cutter, a support for the work movable into one position to receive the work and into another to present it to the tool, yielding means for urging the presser toward the support, a stop for limiting this movement, a second stop for limiting the movement of the presser away from the support, and a gage for positioning the work.

In testimony whereof I have signed my name to this specification.

FREDERICK M. FURBER.